US011376678B2

(12) United States Patent
Li et al.

(10) Patent No.: US 11,376,678 B2
(45) Date of Patent: Jul. 5, 2022

(54) RECIPROCATING SAW

(71) Applicant: Nanjing Chervon Industry Co., Ltd., Nanjing (CN)

(72) Inventors: Jiang Li, Nanjing (CN); Lai Liu, Nanjing (CN); Feng Wang, Nanjing (CN); Yang Zhou, Nanjing (CN); Hao Gao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/370,178

(22) Filed: Jul. 8, 2021

(65) Prior Publication Data

US 2022/0009011 A1    Jan. 13, 2022

(30) Foreign Application Priority Data

Jul. 9, 2020   (CN) .......................... 202010654895.6
Jul. 9, 2020   (CN) .......................... 202010655034.X

(51) Int. Cl.
*B23D 51/16* (2006.01)
*B23D 49/16* (2006.01)

(52) U.S. Cl.
CPC .......... *B23D 51/16* (2013.01); *B23D 49/165* (2013.01)

(58) Field of Classification Search
CPC ....... B23D 51/16; B23D 49/16; B23D 49/165

USPC ......................................................... 30/392
See application file for complete search history.

(56) References Cited

U.S. PATENT DOCUMENTS

| 6,357,125 | B1* | 3/2002 | Feldmann | ............. | B23D 51/16 |
| | | | | | 30/277.4 |
| 2012/0192438 | A1* | 8/2012 | Aoki | ................... | B23D 49/165 |
| | | | | | 30/392 |
| 2020/0070265 | A1* | 3/2020 | Wang | ................... | B25D 17/24 |
| 2021/0213548 | A1* | 7/2021 | Castanos | ............. | B23D 49/162 |

* cited by examiner

*Primary Examiner* — Nhat Chieu Q Do
(74) *Attorney, Agent, or Firm* — Greenberg Traurig, LLP

(57) ABSTRACT

A reciprocating saw includes a casing, a power assembly, a transmission assembly, a reciprocating assembly, a swing assembly, and a balance weight. The transmission assembly includes a first transmission member that is capable of being driven by the power assembly to rotate around a first axis. The swing assembly includes a floating support member configured to drive the reciprocating assembly to perform an orbital motion. The first transmission member is provided with a cam surface configured to be in contact with the floating support member to drive the floating support member to move in an up-and-down direction parallel to the first axis. The balance weight is provided with an escape opening, and the escape opening is disposed on a path on which the floating support member moves in the up-and-down direction.

19 Claims, 13 Drawing Sheets

RECIPROCATING SAW

RELATED APPLICATION INFORMATION

This application claims the benefit under 35 U.S.C. § 119(a) of Chinese Patent Application No. CN 202010654895.6, filed on Jul. 9, 2020, and Chinese Patent Application No. CN 202010655034.X, filed on Jul. 9, 2020, which are incorporated by reference in their entirety herein.

BACKGROUND

A reciprocating saw is a cutting tool for sawing with a reciprocating saw blade. As a type of electric saw, the reciprocating saw is often used for sawing sheet metal, pipes, or profiles or forming bevels by cutting steel pipes. Of course, the reciprocating may also cut cables or other nonmetal materials. The reciprocating saw is generally composed of a casing, a motor, a transmission mechanism, a saw blade, and so on, and the torque of the motor is converted into the linear reciprocating movement of the saw blade through the transmission mechanism so that cutting is achieved.

At present, the reciprocating saw is needed on many occasions. To improve the cutting efficiency, the reciprocating saw is provided with an orbital structure. However, when the existing reciprocating saw is provided with a orbital structure, the dimension of the reciprocating saw in the up-and-down direction is too large, and thus it is inconvenient for users to operate.

SUMMARY

A reciprocating saw includes a casing, a power assembly, a transmission assembly, a reciprocating assembly, a swing assembly, and a balance weight. The power assembly is configured to provide power and includes a motor. The transmission assembly is connected to the power assembly. The reciprocating assembly is connected to the transmission assembly, and the reciprocating assembly includes an output assembly for a cutting accessory to be installed. The swing assembly is disposed between the transmission assembly and the reciprocating assembly. The balance weight is at least partially disposed between the transmission assembly and the reciprocating assembly and is configured to balance movement of the reciprocating assembly. The transmission assembly includes a first transmission member that is capable of being driven by the power assembly to rotate around a first axis. The swing assembly includes a floating support member configured to drive the reciprocating assembly to perform an orbital motion. The first transmission member is provided with a cam surface configured to be in contact with the floating support member to drive the floating support member to move in an up-and-down direction parallel to the first axis. The balance weight is provided with an escape opening, and the escape opening is disposed on a path on which the floating support member moves in the up-and-down direction.

A reciprocating saw includes a casing, a reciprocating assembly, a power assembly, a transmission assembly, a swing assembly, and a balance weight. The reciprocating assembly includes an output assembly for a cutting accessory to be installed. The power assembly includes a motor configured to drive the reciprocating assembly. The transmission assembly transmits power between the power assembly and the reciprocating assembly. The swing assembly includes a floating support member configured to drive the reciprocating assembly to perform an orbital motion. The balance weight is at least partially disposed between the transmission assembly and the reciprocating assembly and is configured to balance movement of the reciprocating assembly. The transmission assembly includes a first transmission member that is rotatable around a first axis. The first transmission member is provided with a cam surface configured to be in contact with the floating support member to drive the floating support member to move. The balance weight is provided with an escape opening, and the escape opening is disposed on a path on which the floating support member moves in an up-and-down direction.

DETAILED DESCRIPTION

Figure 1:
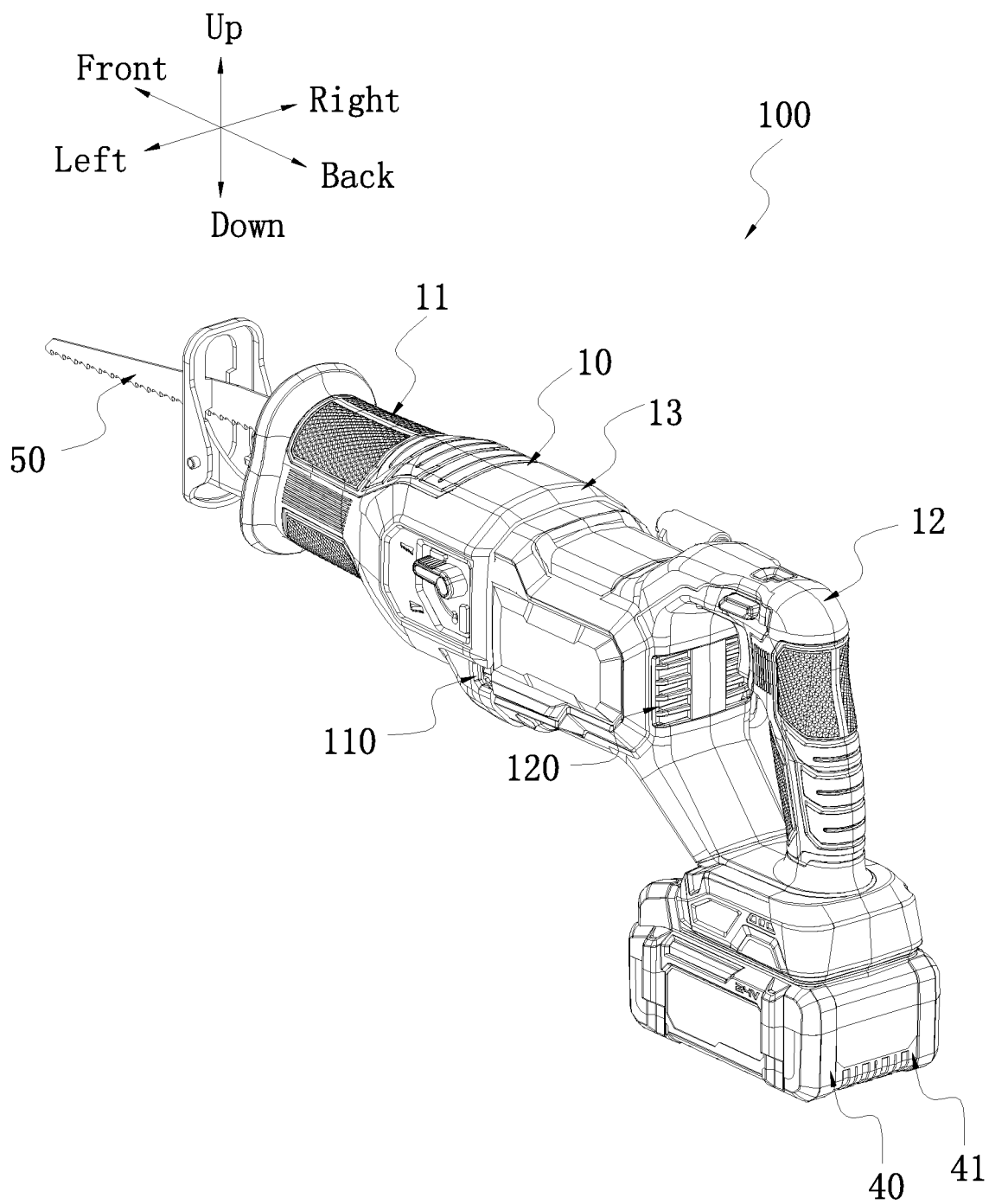
FIG. 1 is a perspective view of a reciprocating saw according to an example of the present disclosure.

As shown in FIGS. 1 to 6, a reciprocating saw 100 includes a casing 10, a power assembly 20, a reciprocating assembly 31, a transmission assembly 32, a shock absorption component 33, a swing assembly 34, an energy source device 40, and a cutting accessory. The power assembly 20 is disposed in the casing 10 and is configured to provide power for the reciprocating saw 100. The power assembly 20 includes a motor 21, and the motor 21 includes a motor shaft 211 that is rotatable around a motor axis 101. The energy source device 40 is installed on the casing 10 and is configured to provide an energy source. In this example, the energy source device 40 includes a battery pack 41. Of course, the battery pack 41 and the casing 10 may be disposed separately, that is, the battery pack 41 is not directly installed on the surface of the casing 10. The casing 10 is fixedly connected to or integrally formed with a first gripping portion 11 and a second gripping portion 12 for a user to grip and a connection portion 13 connecting the first gripping portion 11 and the second gripping portion 12. In a front-and-back direction, the first gripping portion 11 is disposed adjacent to the cutting accessory, the second gripping portion 12 is disposed on a back side of the reciprocating saw 100, and the second gripping portion 12 is a handle. The transmission assembly 32 is disposed in the connection portion 13 and is configured to convert the rotational movement output by the motor shaft 211 into the reciprocating movement of the reciprocating assembly 31. One end of the reciprocating assembly 31 is connected to the transmission assembly 32, and the other end of the reciprocating assembly 31 is configured to be connected to the cutting accessory. In this example, the cutting accessory is specifically a saw blade 50. During the operation of the reciprocating saw 100, the shock absorption component 33 moves in a direction substantially opposite to the movement direction of the reciprocating assembly 31 to balance the reciprocating movement of the reciprocating assembly 31, and the shock absorption component 33 includes a balance weight 331. The swing assembly 34 is disposed adjacent to the reciprocating assembly 31 and may provide the reciprocating assembly 31 with a supporting force whose direction is different from the movement direction of the reciprocating assembly 31. In this example, the transmission assembly 32, the shock absorption component 33, and the swing assembly 34 are all disposed in an accommodation cavity of a gear box 14.

Referring to FIGS. 4 to 7, specifically, the reciprocating assembly 31 includes a reciprocating rod 311 that is substantially disposed along a direction of an axis of the reciprocating rod 311. In the case where the reciprocating rod 311 is driven by the motor shaft 211, the reciprocating rod 311 can reciprocate relative to the casing 10 along the direction of the axis of the reciprocating rod 311. An end of the reciprocating rod 311 may be provided with an output assembly that is configured to be connected to the saw blade 50. The transmission assembly 32 includes a first transmission member 321 that can be driven by the motor 21 to rotate around a first axis 102, a rotation member 322 that is disposed on an upper side of the first transmission member 321 and is fixedly connected to the first transmission member 321, and an eccentric member 323 that is connected to the rotation member 322 and can be driven by the rotation member 322 to rotate. The reciprocating rod 311 is formed with a guide groove 316. The eccentric member 323 fits with the guide groove 316 of the reciprocating rod 311. The eccentric member 323 is capable of sliding in the guide groove 316. The length of the eccentric member 323 along the front-and-back direction is substantially the same as the width of the guide groove 316 along the front-and-back direction. That is, the eccentric member 323 is driven to rotate so that the reciprocating movement of the reciprocating rod 311 can be achieved. Further, the surface of the eccentric member 323 is spherical. In this manner, the eccentric member 323 can better fit with the guide groove of the reciprocating rod 311 when the eccentric member 323 rotates. The swing assembly 34 includes a floating support member 341 disposed between the first transmission member 321 and the reciprocating rod 311. The floating support member 341 is configured to achieve the transmission connection between the reciprocating rod 311 and the first transmission member 321. The first transmission member 321 includes a cam surface 3211, and the floating support member 341 can achieve the transmission between the cam surface 3211 and the reciprocating rod 311, that is, the cam surface 3211 can drive the floating support member 341 to perform a floating movement in an up-and-down direction, that is, the cam surface 3211 can drive the reciprocating rod 311 to move in the up-and-down direction. It is to be noted herein that the floating movement refers to that the cam surface 3211 drives the floating support member 341 to reciprocate along the up-and-down direction, that is, in the case where the cam surface 3211 exerts a supporting force on the floating support member 341, the floating support member 341 may also move back and forth along the up-and-down direction while being subjected to the force to rotate along an axis of the floating support member 341. In addition, the floating movement may also be construed as that the cam surface 3211 drives the floating support member 341 to reciprocate along a direction obliquely intersecting the first axis 102.

As shown in FIGS. 4 to 12, in the up-and-down direction, the balance weight 331 is disposed between the reciprocating rod 311 and the first transmission member 321, and the balance weight 331 is provided with an escape opening 3311 that allows the floating support member 341 to extend in, that is, the floating support member 341 is at least partially disposed in the escape opening 3311, and the floating support member 341 passes through the escape opening 3311. In this manner, the dimension of the connection portion 13 in the up-and-down direction may be made more reasonable. The cam surface 3211 of the first transmission member 321 is used as a orbital inclined surface and is configured to fit with the floating support member 341 so that an orbital structure can be achieved, the space on the upper side of the first transmission member 321 can be fully utilized, the complete machine structure is more compact, and thus the dimension of the floating support member 341 in the up-and-down direction can be reduced; in addition, an increase in the dimension of the reciprocating saw 100 in the front-and-back direction can be avoided while it is ensured that the dimension of the reciprocating saw 100 in the up-and-down direction is reduced. Further, the following case can also be avoided: in the case where an orbital motion is achieved in other manners, other parts need to be disposed to drive the reciprocating rod 311 and the balance weight 331 so that the structure is too complicated. That is, through the preceding arrangement, the structure can be greatly simplified. It is to be noted that in the present application, the first axis 102 extends substantially along the up-and-down direction.

The balance weight 331 is recessed forward to form the escape opening 3311 so that the overall dimension E1 of the balance weight 331 and the floating support member 341 in the front-and-back direction is less than the sum of the dimension E2 of the balance weight 331 in the front-and-back direction and the dimension E3 of the floating support member 341 in the front-and-back direction, that is, $E1 < E2 + E3$.

Referring to FIGS. 6 to 9, the swing assembly 34 is disposed on the upper side of the first transmission member 321 and is connected to the reciprocating assembly 31. The reciprocating assembly 31 includes a sleeve 312 fixed on the reciprocating rod 311, the swing assembly 34 is connected to the sleeve 312, and the floating support member 341 is movable between a supporting position and a releasing position in the up-and-down direction. Specifically, in the case where the floating support member 341 is in the releasing position, the cam surface 3211 is separated from the floating support member 341. Herein separation may refer to that the cam surface 3211 is not in contact with the floating support member 341 or may refer to that the cam surface 3211 is in contact with the floating support member 341 with no supporting force therebetween. In the case where the floating support member 341 is in the supporting position, the cam surface 3211 is in contact with the floating support member 341. In this case, the first transmission member 321 can drive the floating support member 341 to move in the up-and-down direction so that the reciprocating rod 311 is driven, and thus the function of the orbital motion can be achieved. It is to be noted herein that in the case where the floating support member 341 is in the supporting position, the amount of the orbital motion of the reciprocating saw 100 is the largest, that is, the first transmission member 321 is always in contact with the floating support member 341 during the rotation. In the case where the floating support member 341 is in the releasing position, that is, the reciprocating rod 311 is merely subjected to the driving force of the eccentric member 323 during the movement of the reciprocating rod 311, no supporting force exists between the first transmission member 321 and the floating support member 341 during the rotation of the first transmission member 321. The swing assembly 34 further includes an operating handle 342 and a orbital bracket 343, where the operating handle 342 is configured to operate the floating support member 341 to move between the supporting position and the releasing position, and the operating handle 342 is specifically installed on the gear box 14. The floating support member 341 is rotatably connected to the orbital bracket 343. In the case where the floating support member 341 moves, the orbital bracket 343 also moves. The orbital bracket 343 is fixedly connected to the reciprocating rod 311. Similarly, in the case where the operating handle 342 moves, the operating handle 342 may drive the floating support member 341 to switch between the supporting position and the releasing position through the orbital bracket 343. The operating handle 342 extends along a first straight line 103, and the operating handle 342 is rotatable around the first straight line 103. During the rotation of the operating handle 342, the sleeve 312 on the reciprocating rod 311 can be driven so that the orbital bracket 343 drives the floating support member 341 to switch between the supporting position and the releasing position. In this example, the operating handle 342 is substantially a cylinder, and the operating handle 342 is provided with a groove surface 3421 and an arc surface 3422. In the case where the floating support member 341 is in the supporting position, the groove surface 3421 is in contact with the sleeve 312; in the case where the floating support member 341 is in the releasing position, the arc surface 3422 is in contact with the sleeve 312. For ease of description, the supporting position is defined herein as the initial position of the floating support member 341. Specifically, in the case where the operating handle 342 rotates around the first straight line 103 along the first direction T from the initial position, the operating handle 342 drives the sleeve 312 to move upward, and thus the orbital bracket 343 and the floating support member 341 are driven farther from the cam surface 3211. In the case where the operating handle 342 rotates around the first straight line 103 along a second direction F to the releasing position, the operating handle 342 drives the sleeve 312 to move downward, and thus the orbital bracket 343 and the floating support member 341 are driven to be closer to the cam surface 3211. It can be seen that the operating handle 342 has multiple intermediate positions that may be maintained during the rotation process. In the case where the floating support member 341 is in a certain intermediate position, the case where the cam surface 3211 is partially in contact with the floating support member 341 exists during the rotation of the first transmission member 321, that is, in the case where the first transmission member 321 rotates, merely part of the cam surface 3211 can support the floating support member 341. The greater the rotation angle of the operating handle 342 along the first direction T is, the less the area of the cam surface 3211 that can generate the driving force on the floating support member 341 is, that is, the less the amount of the orbital motion is; and otherwise the greater the amount of the orbital motion is. In an example, the cam surface 3211 is the upper surface of the first transmission member 321. Specifically, the cam surface 3211 is an inclined surface with a height difference so that the orbital motion can be achieved. In another example, the upper surface of the first transmission member is fixedly connected to or integrally formed with a protrusion, the cam surface is the surface of the protrusion, and the protrusion is irregular, that is, the projection of the protrusion on the plane perpendicular to the first axis is irregular. In this case, the floating support member fitting with the cam surface may be disposed along a direction obliquely intersecting the first axis so that the orbital motion can be achieved, and thus the floating support member reciprocates along the direction obliquely intersecting the first axis. This arrangement makes the structure more compact.

In the front-and-back direction, the swing assembly 34 is disposed between the eccentric member 323 and the second gripping portion 12, that is, the swing assembly 34 is disposed at the back end of the reciprocating assembly 31, that is, the orbital bracket 343 is fixedly installed on the sleeve 312 at the back end of the reciprocating rod 311, and the floating support member 341 is adjacently disposed at the back end of the reciprocating rod 311. In this manner, the following case can be avoided: in the case where the swing assembly 34 is disposed on the front side of the eccentric member 323, the escape opening 3311 that is on the balance weight 331 and allows the floating support member 341 to extend in is too large so that the structural strength of the balance weight 331 is insufficient, and thus during the operation process of the reciprocating saw 100, the balance weight 331 is damaged due to vibration, thereby affecting the use of the machine. Of course, the orbital bracket 343 may also be installed on other parts at the back end of the reciprocating assembly 31 as long as the orbital motion can be achieved, and where the orbital bracket 343 is specifically installed is not limited. Further, the escape opening 3311 has a width W1 along a left-and-right direction perpendicular to the up-and-down direction, and the floating support member 341 has a width W2 along the left-and-right direction perpendicular to the up-and-down direction, where W1 is greater than W2, that is, the escape opening 3311 has the sufficient width that allows the floating support member 341 to move.

Figure 2:
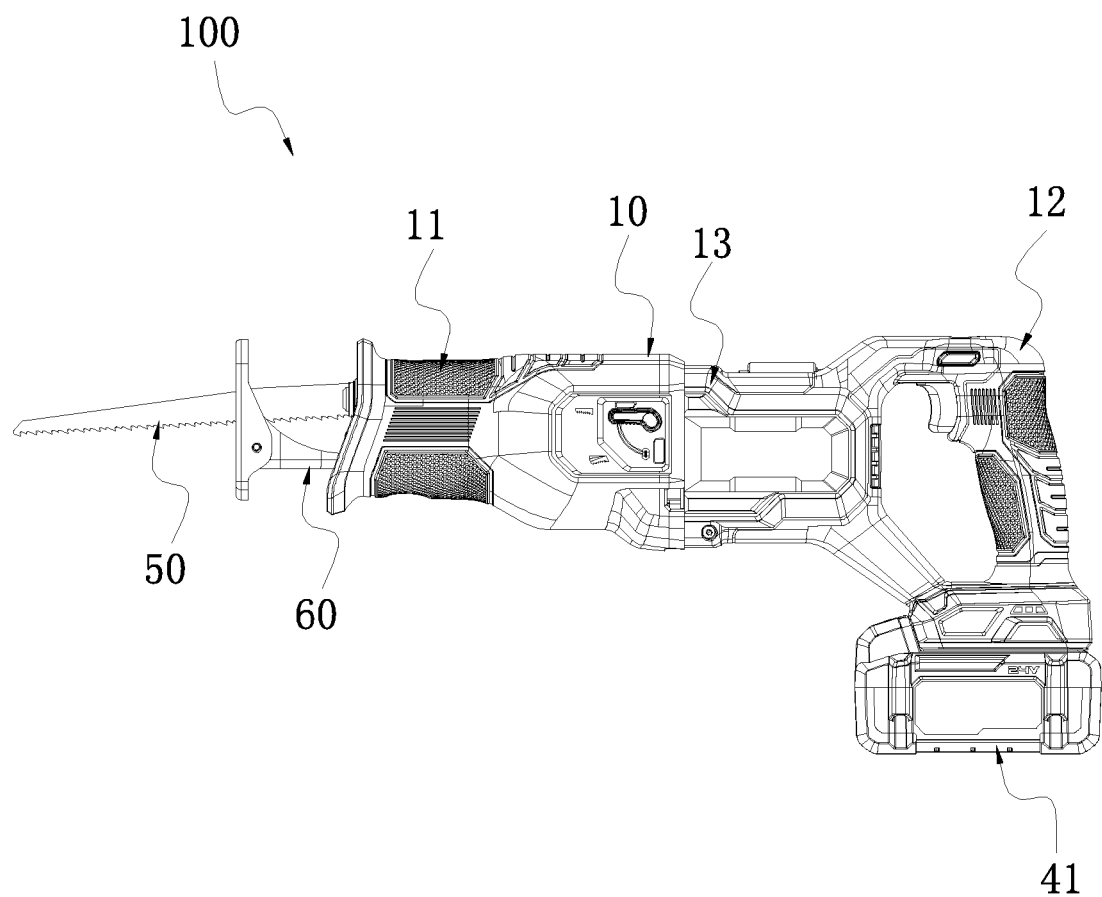
FIG. 2 is a plan view of the reciprocating saw shown in FIG. 1.
Figure 3:
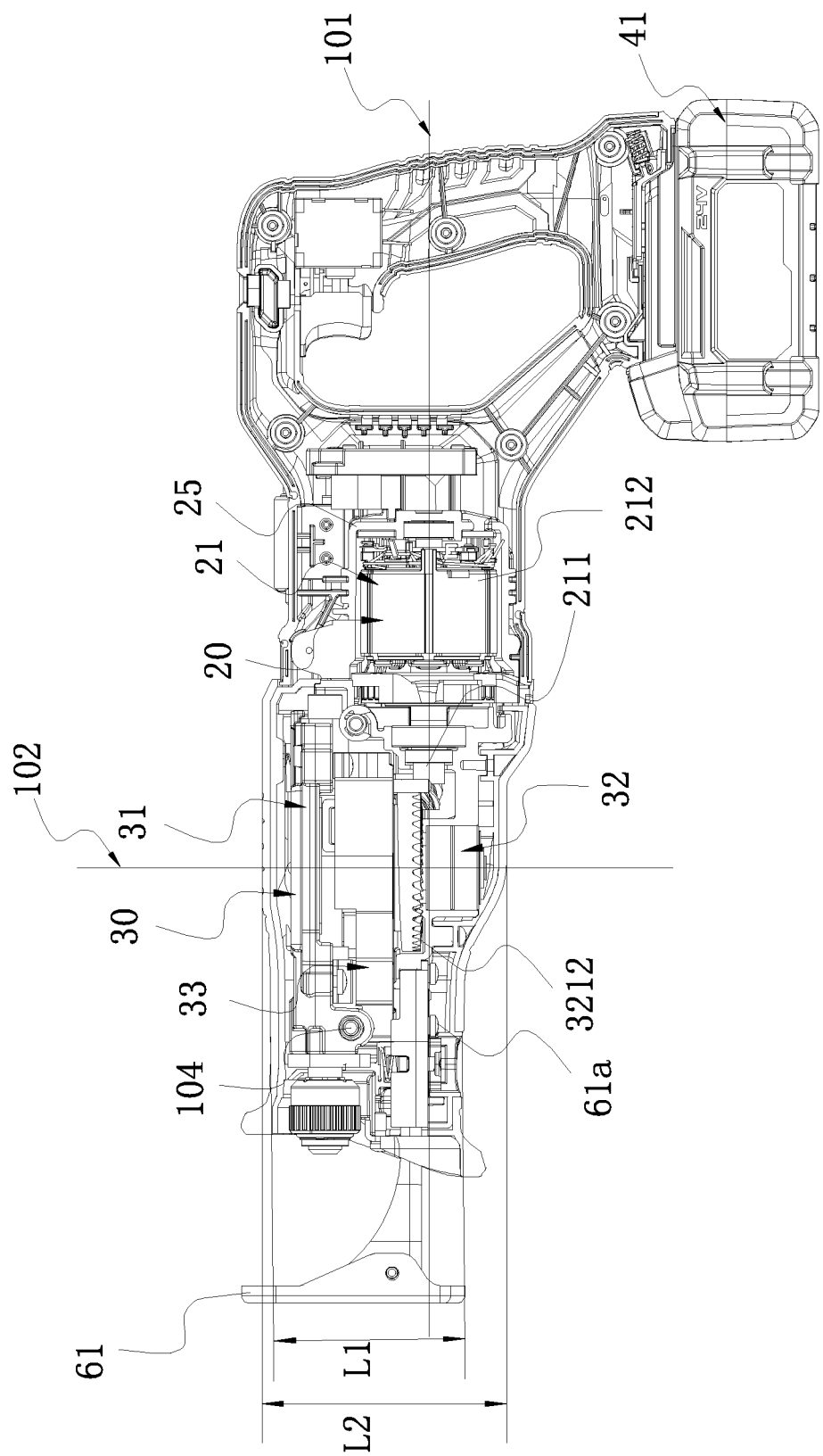
FIG. 3 is a plan view of part of the structure of the reciprocating saw shown in FIG. 1.
Figure 4:
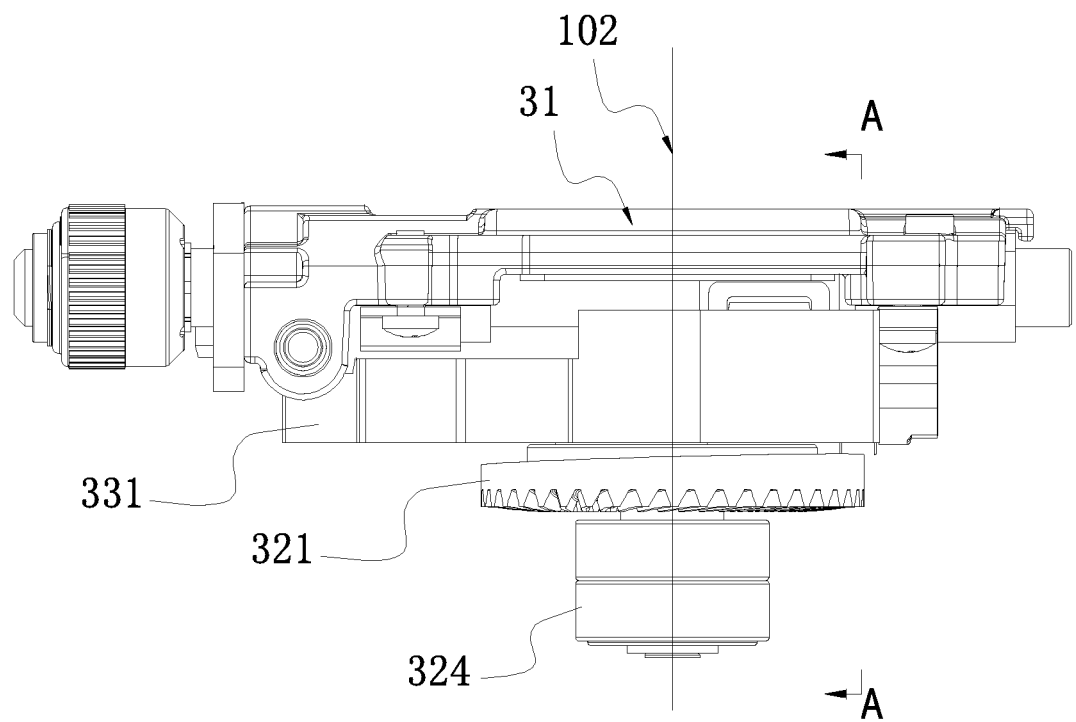
FIG. 4 is a plan view of part of the structure of the reciprocating saw shown in FIG. 1.
Figure 5:
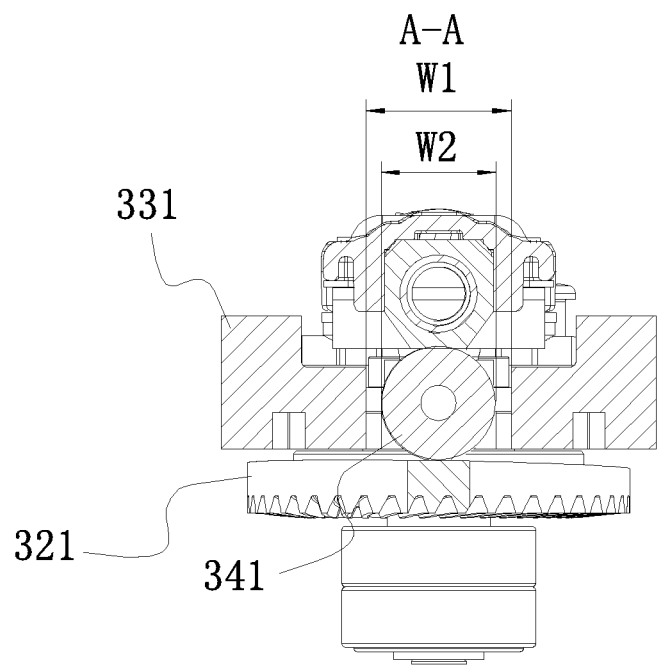
FIG. 5 is a sectional view of part of the structure of the reciprocating saw shown in FIG. 4 taken along an A-A direction.
Figure 6:
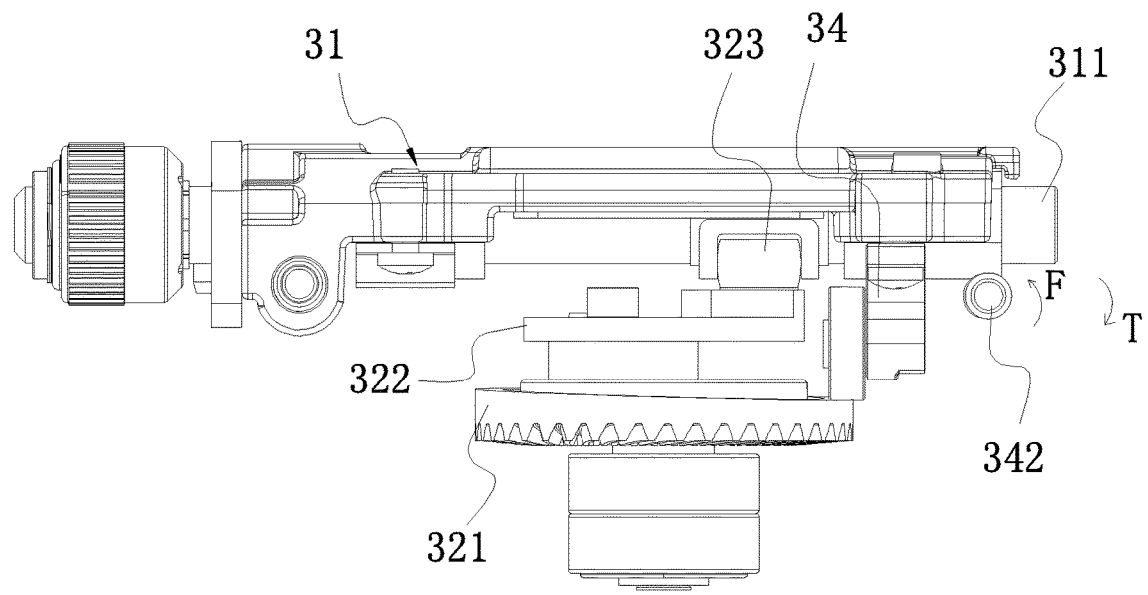
FIG. 6 is a plan view of part of the structure of the reciprocating saw shown in FIG. 1 in a case where an orbital assembly is in a supporting position.
Figure 7:
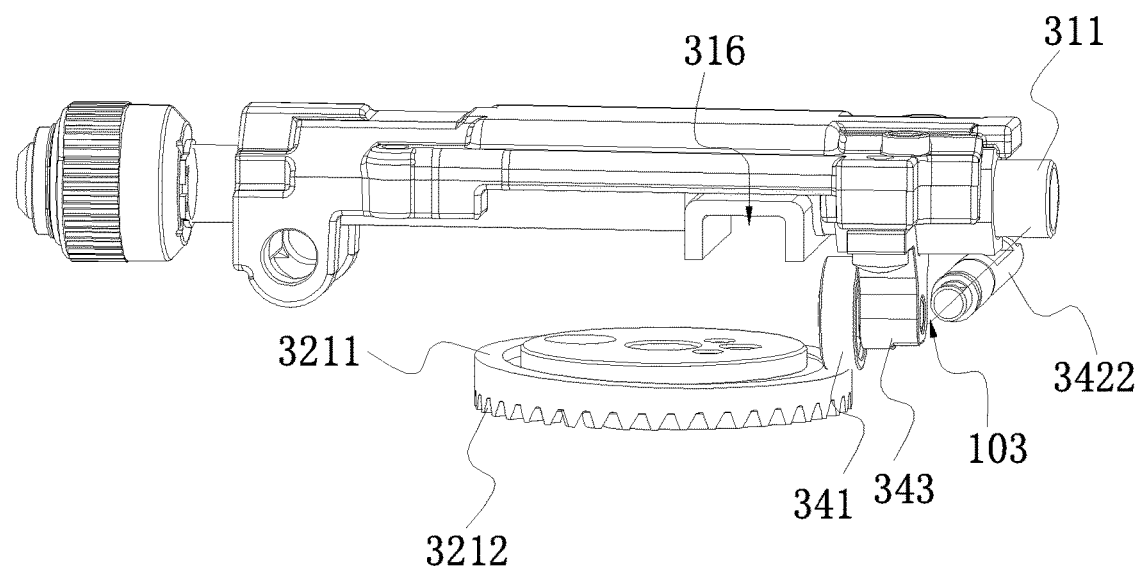
FIG. 7 is a perspective view of part of the structure shown in FIG. 1.
Figure 8:
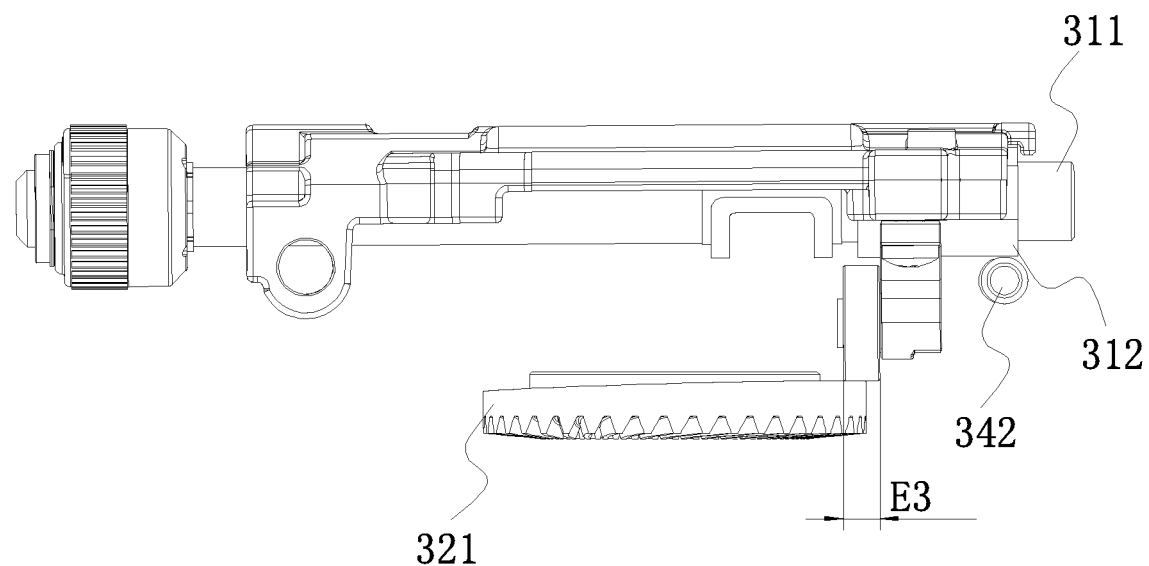
FIG. 8 is a plan view of part of the structure of the reciprocating saw shown in FIG. 1 in a case where the orbital assembly is in a releasing position.
Figure 9:
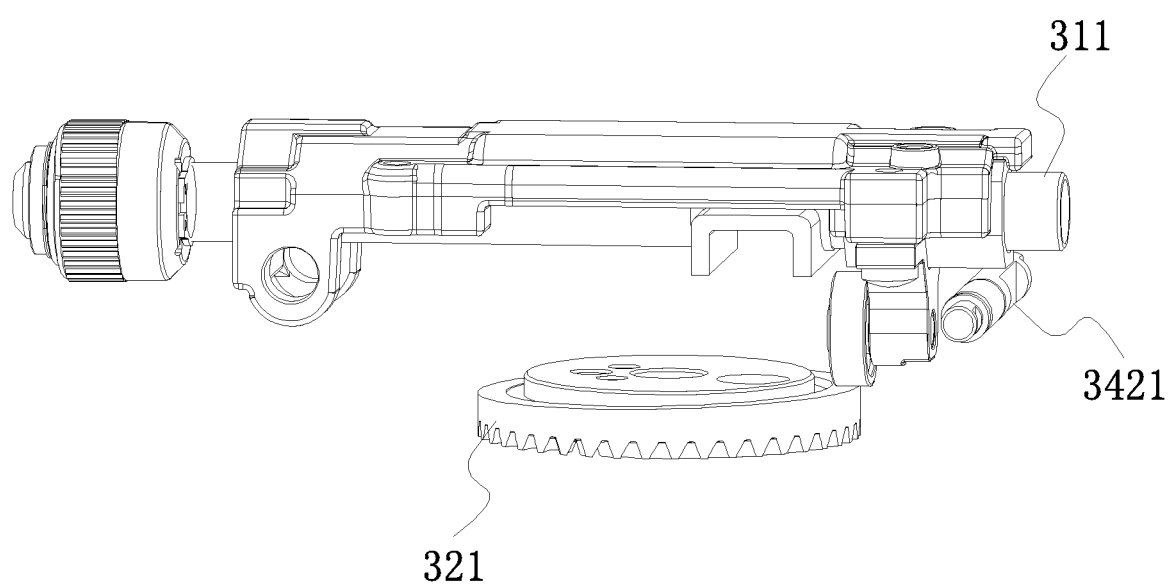
FIG. 9 is a perspective view of the part of the structure shown in FIG. 7.
Figure 10:
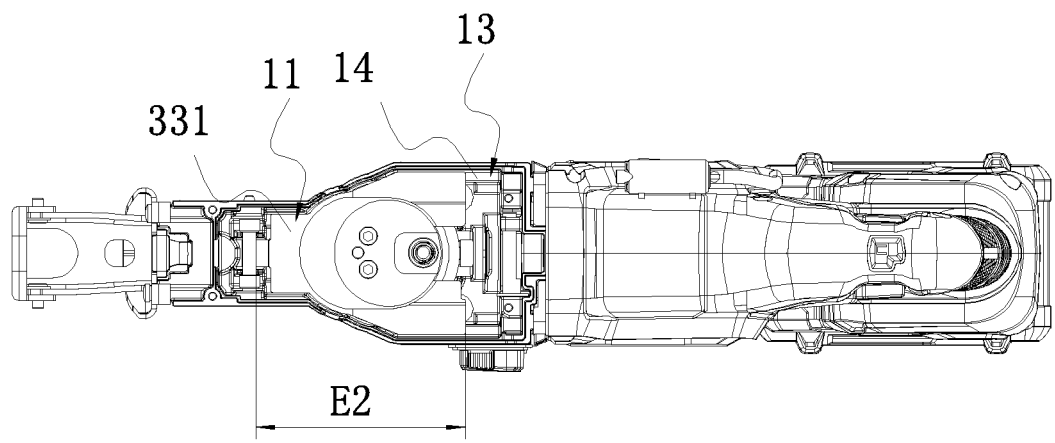
FIG. 10 is a top view of part of the structure of the reciprocating saw shown in FIG. 1.
Figure 11:
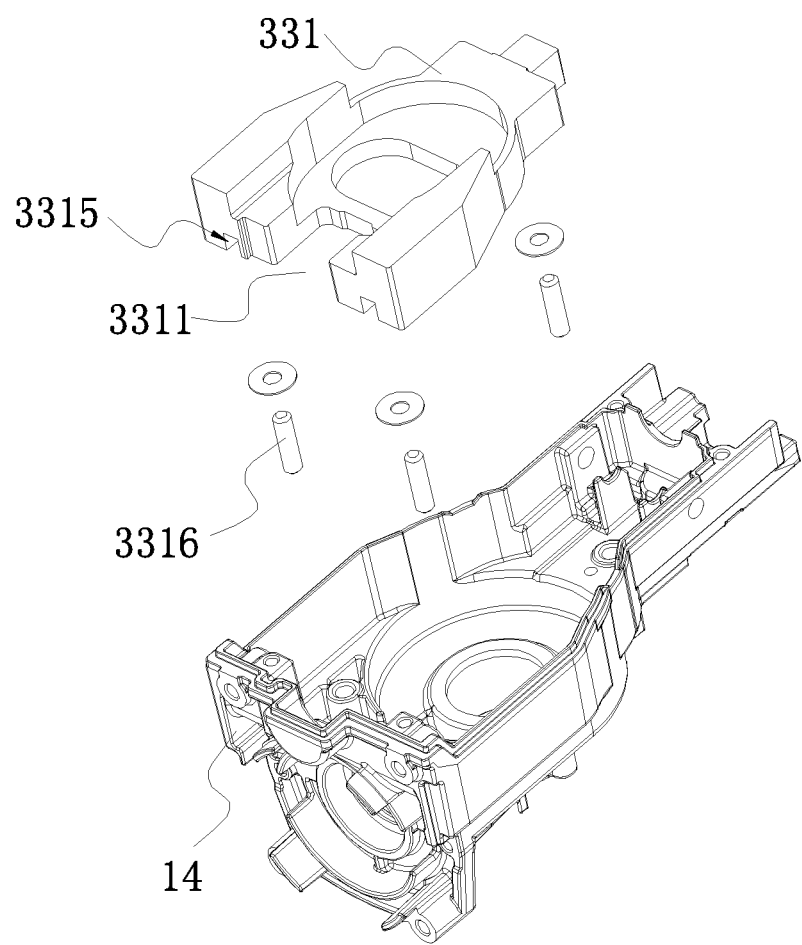
FIG. 11 is an exploded view of part of the structure of the reciprocating saw shown in FIG. 1.
Figure 12:
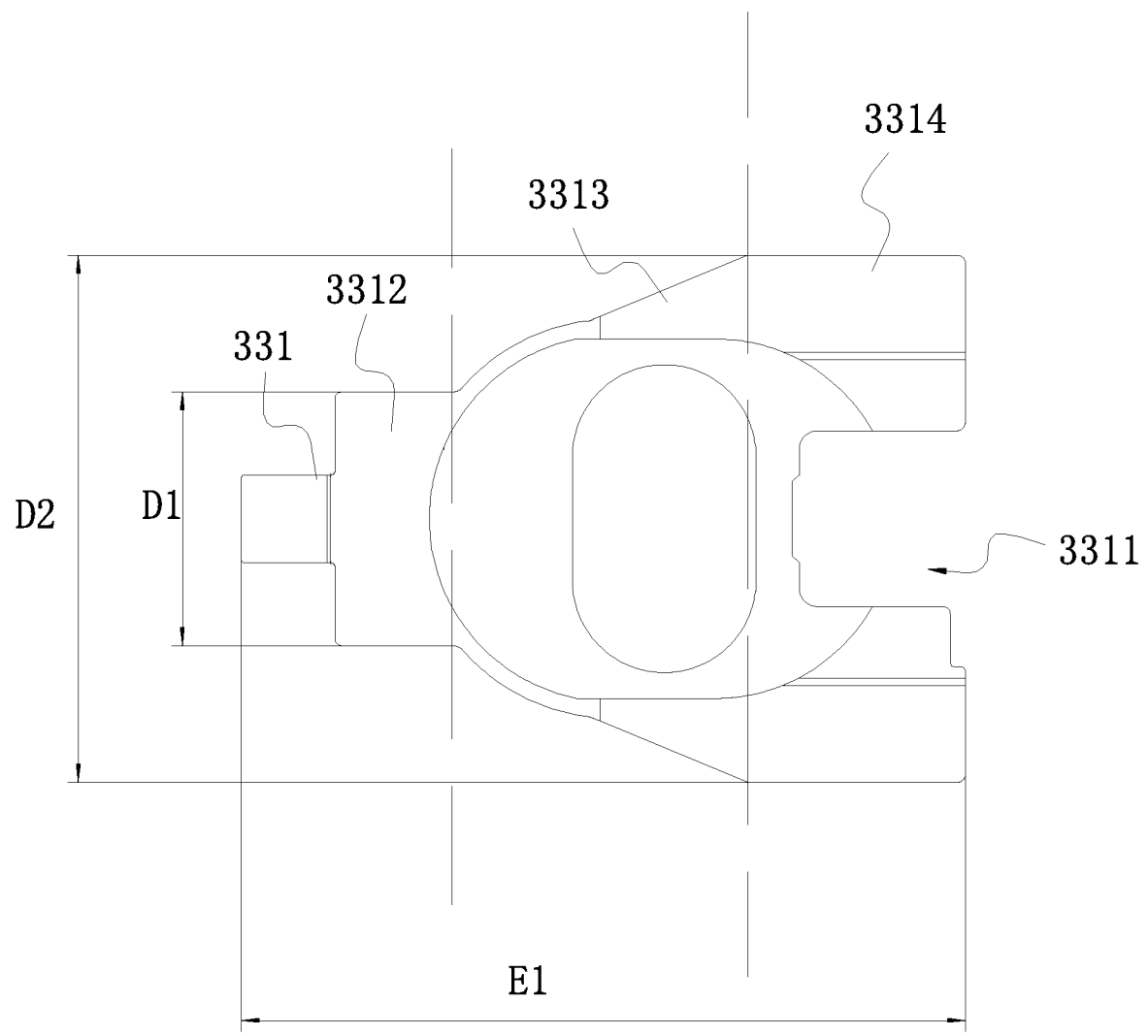
FIG. 12 is a top view of a balance weight in the reciprocating saw shown in FIG. 1.
Figure 13:
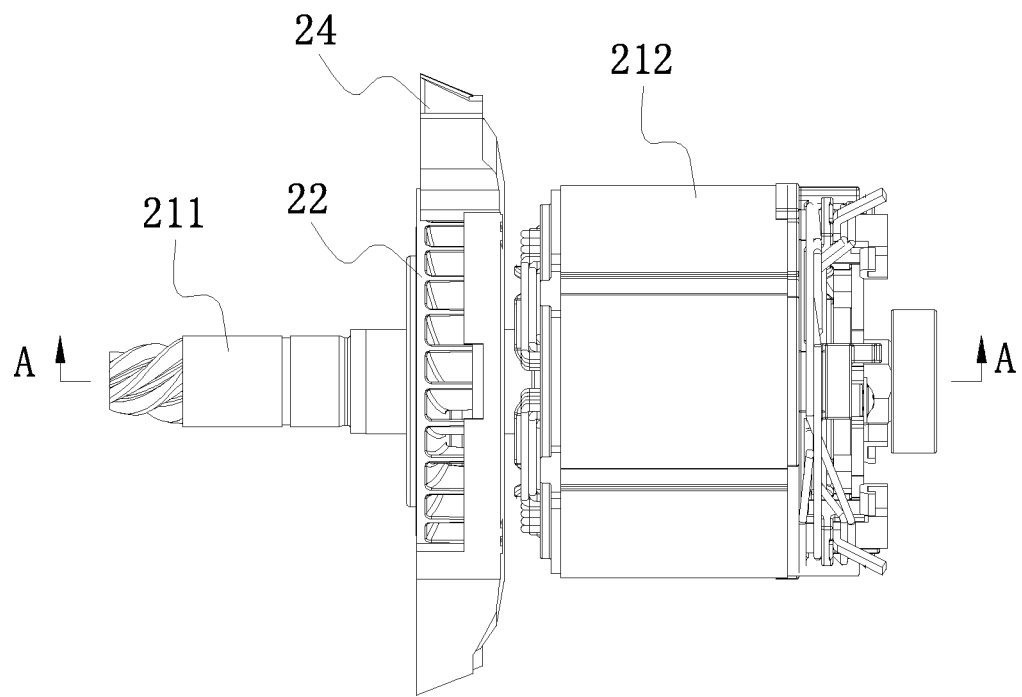
FIG. 13 is a plan view of part of the structure of the reciprocating saw shown in FIG. 1.
Figure 14:
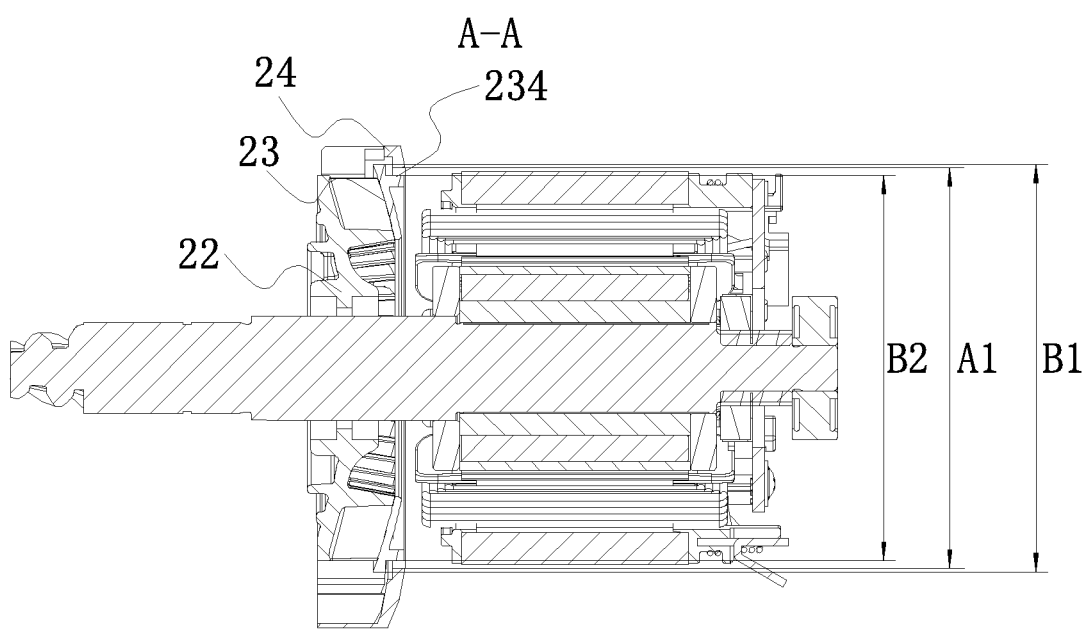
FIG. 14 is a sectional view of part of the structure of the reciprocating saw shown in FIG. 11.
Figure 15:
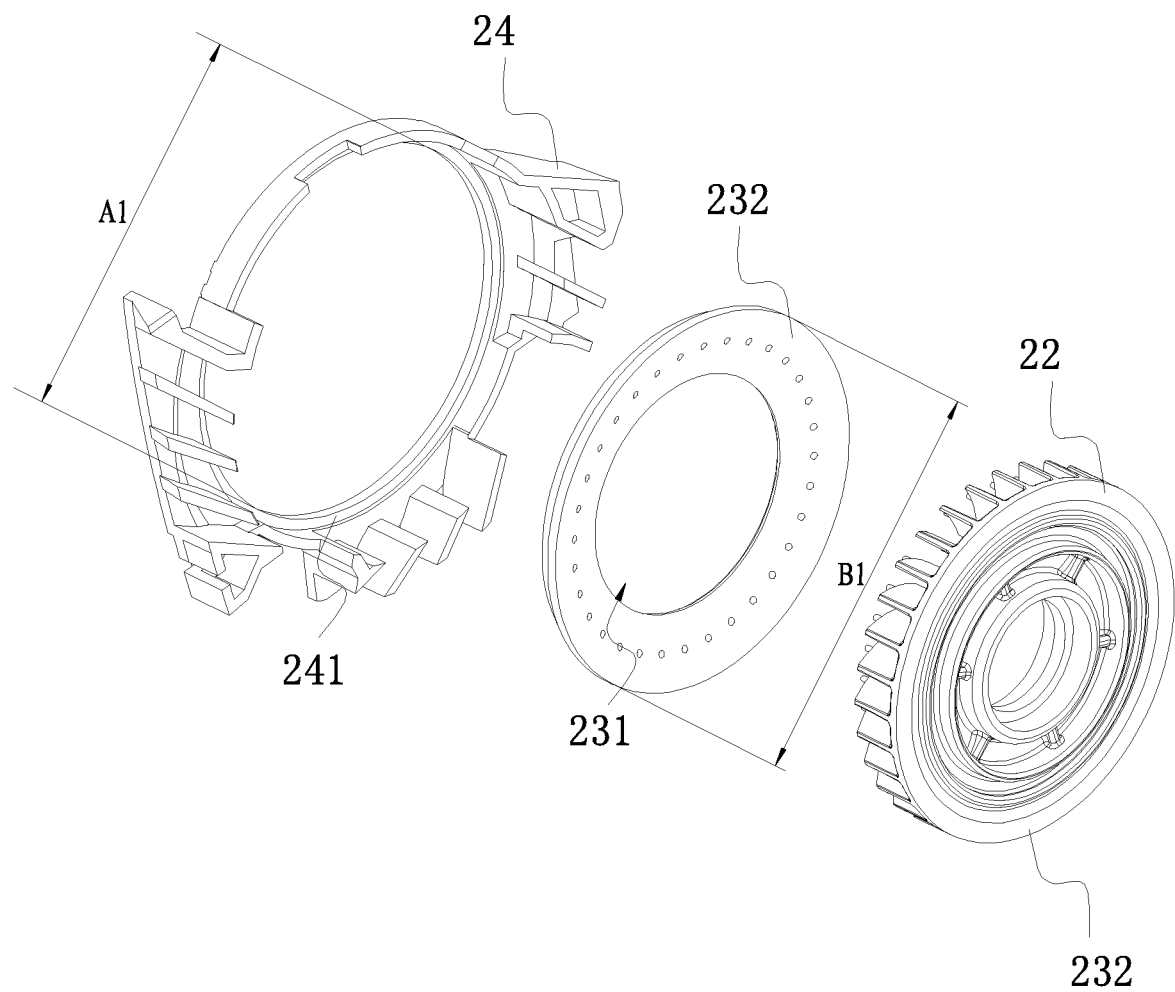
FIG. 15 is an exploded view of part of the structure of the reciprocating saw shown in FIG. 1.
Figure 16:
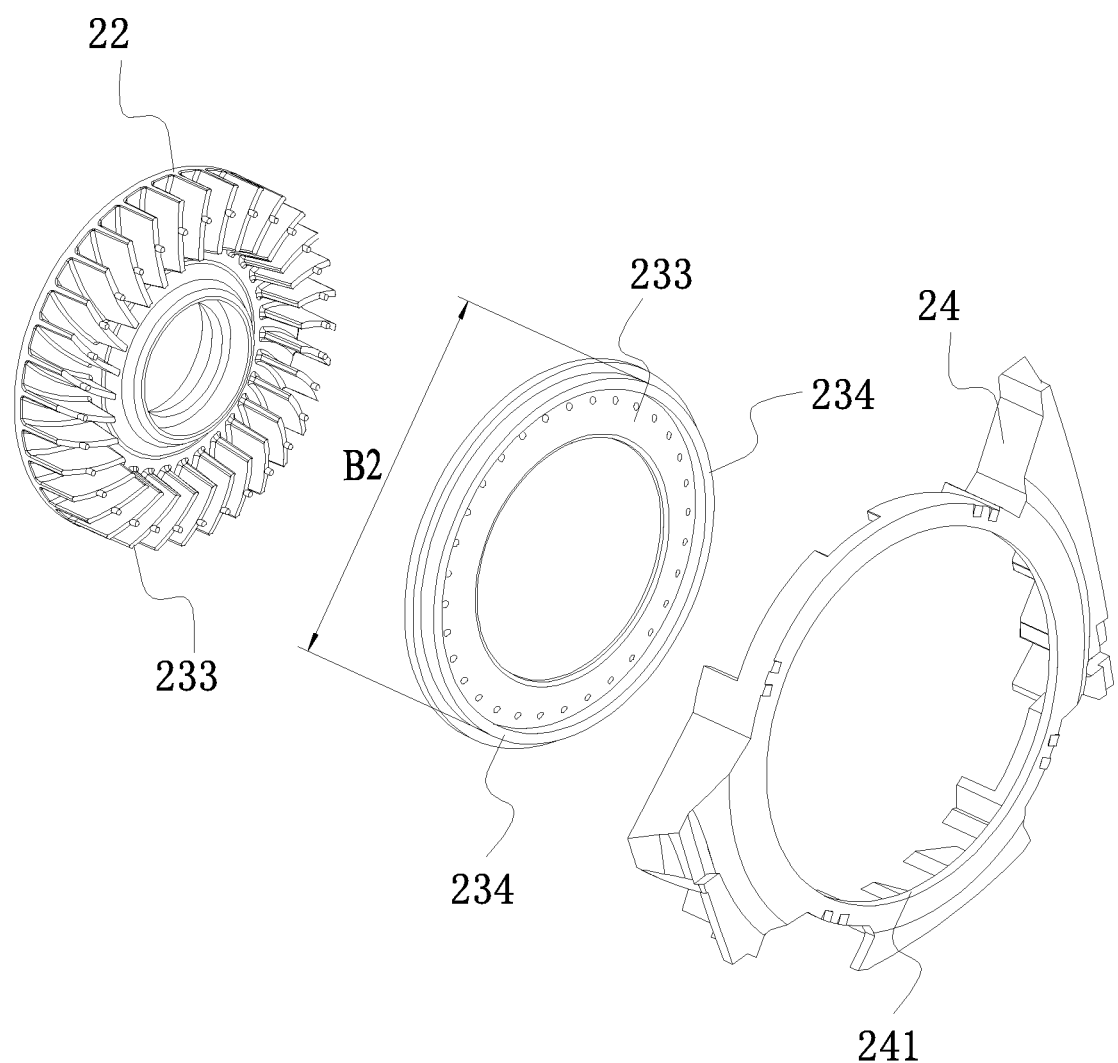
FIG. 16 is an exploded view of part of the structure of the reciprocating saw shown in FIG. 15 from another viewing angle.
Figure 17:
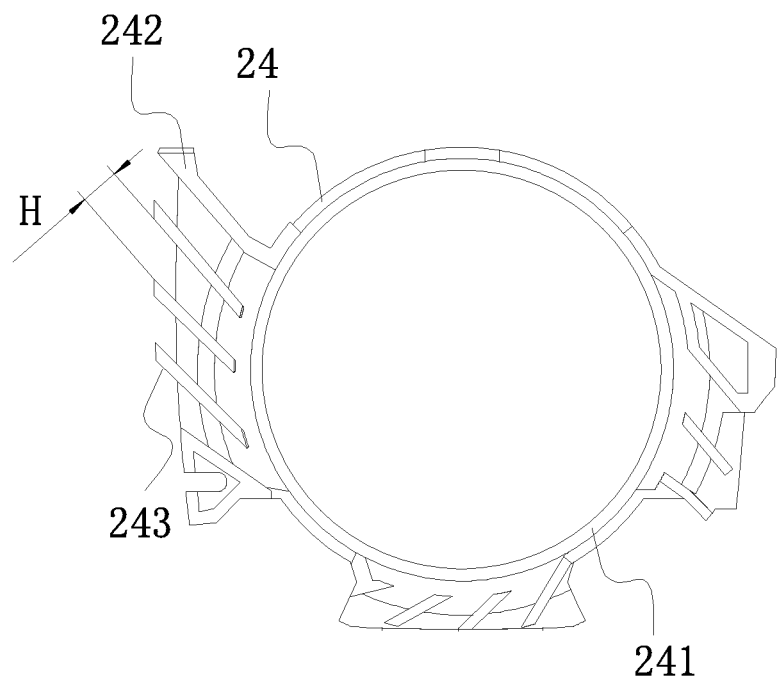
FIG. 17 is a plan view of a drainage component of the reciprocating saw shown in FIG. 1.
Figure 18:
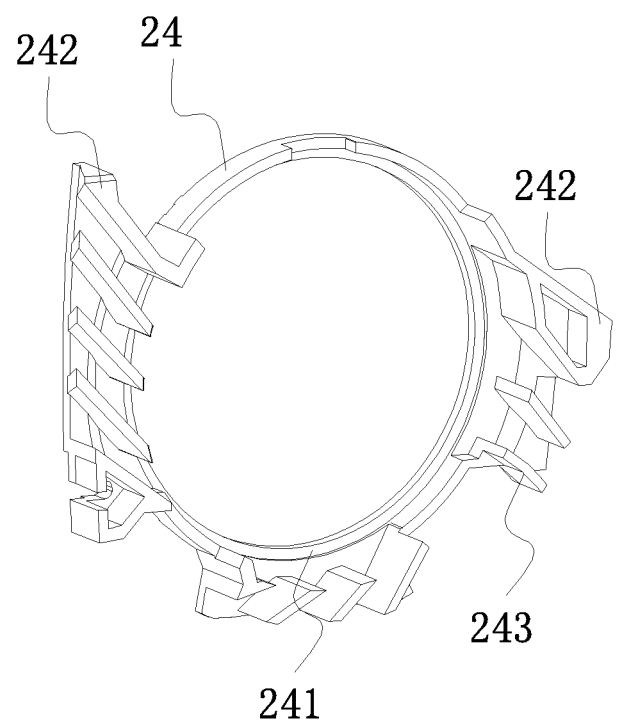
FIG. 18 is a perspective view of the drainage component of the reciprocating saw shown in FIG. 1.

Referring to FIGS. 2 to 3, the reciprocating saw 100 further includes a support base component 60 that is at least partially disposed in the casing 10, the support base component 60 includes a support base 61, the support base 61 is installed on the casing 10, and at least one installation position 61a on which the support base 61 is installed exists on the casing 10. It is to be noted that in the case where the support base 61 is fixedly connected to the casing 10, the installation position 61a refers to the position where the support base 61 and the casing 10 are fixedly connected to each other. In the case where the support base 61 is slidably connected to the casing 10, the installation position 61a refers to the position of an adjustment component that is configured to adjust the distance between the part of the support base 61 extending out of the casing 10 and the casing 10. In this example, the support base 61 is slidably connected to the casing 10, an adjustment button is used to adjust the position of the support base 61, the installation position 61a is disposed at the first gripping portion 11, the casing 10 at the installation position 61a has a first distance L1 along the direction of the first axis 102, and the casing 10 at the floating support member 341 has a third distance L3 along the direction of the first axis 102, where the ratio of the first distance L1 to the third distance L3 is greater than or equal to 0.65 and less than or equal to 0.75. In this manner, the dimension of the connection portion 13 of the reciprocating saw 100 in the up-and-down direction is within a reasonable range. In some special working conditions, for example, the workpiece to be cut is in some narrow positions, and when the user grips the first gripping portion 11 to cut the workpiece, the working cannot be performed; in this case, the user holds the connection portion 13 with one hand and the second gripping portion 12 with the other hand to operate the reciprocating saw 100; the ratio of the distance at the connection portion 13 in the up-and-down direction to the distance at the first gripping portion 11 in the up-and-down direction is set to be within the preceding range so that the connection portion 13 has enough space for the transmission assembly 32 and the reciprocating assembly 31 to be disposed, and thus the complete machine structure layout is relatively reasonable. Further, in the case where the ratio of the first distance L1 to the third distance L3 is greater than or equal to 0.5 and less than or equal to 0.7, the effect is better.

Further, the transmission assembly 32 further includes a positioning component configured to position the first transmission member 321, the positioning component is disposed on the lower side of the first transmission member 321, and the positioning component includes at least one positioning bearing 324. Specifically, the first transmission member 321 includes a meshing surface 3212 that is disposed opposite to the cam surface 3211, that is, the cam surface 3211 is disposed on the upper side of the meshing surface 3212. It is to be understood that the positioning bearing 324 is located on the lower side of the meshing surface 3212, and for better positioning of the first transmission member 321 and to ensure the structural strength, two positioning bearings 324 are disposed in the transmission assembly 32. In this example, the two positioning bearings 324 are disposed adjacent to each other, that is, the positioning bearings 324 are at least partially in contact with each other, and the casing 10 at the axis of the positioning bearings 324 has a second distance L2 along the direction of the first axis 102, where the ratio of the first distance L1 to the second distance L2 is greater than or equal to 0.6 and less than or equal to 0.8. In this manner, the dimension of the connection portion 13 in the up-and-down direction can be effectively reduced while the structural strength of the transmission assembly 32 can be ensured so that it is convenient for the user to hold the connection portion 13. It is to be noted that in this example, the dimensions of L3 and L2 are substantially the same. In the case of ensuring the structural strength, merely one positioning bearing 324 or multiple positioning bearings 324 may be provided. Further, in the case where the ratio of the first distance L1 to the second distance L2 is greater than or equal to 0.58 and less than or equal to 0.78, the effect is better.

Referring to FIG. 3 and FIGS. 10 to 12, the balance weight 331 is disposed between the cam surface 3211 and the reciprocating rod 311. During the operation of the reciprocating saw 100, the balance weight 331 moves in a direction opposite to the movement direction of the reciprocating rod 311 to balance the reciprocating movement of the reciprocating rod 311. In this example, the balance weight 331 is disposed in the gear box 14 and is capable of sliding in the gear box 14, and the balance weight 331 substantially fits the gear box 14. Specifically, the balance weight 331 includes a first section 3312, a connection section 3313, and a second section 3314. The connection section 3313 is configured to connect the first section 3312 and the second section 3314. The first section 3312 is disposed on the front side of the connection section 3313, that is, the first section 3312 is disposed adjacent to the saw blade 50. Specifically, the first section 3312 is elongated and located in the first gripping portion 11, and the second section 3314 is disposed adjacent to the floating support member 341, that is, the second section 3314 is disposed in the connection portion 13, and the edge of the connection section 3313 is irregular and substantially fits the inside of the gear box 14. A sliding member 3316 is connected to the gear box 14, and a sliding groove 3315 that fits with the sliding member 3316 is formed on the balance weight 331. Specifically, the sliding groove 3315 is formed on the second section 3314. The sliding groove 3315 fits with the sliding member 3316 fixedly connected to the gear box 14 so that the balance weight 331 can slide relative to the gear box 14. To ensure stability, multiple sliding grooves 3315 are disposed on the balance weight 331.

The first section 3312 has a first length D1 along the direction of the first straight line 103, and the second section 3314 has a second length D2 along the direction of the first straight line 103, where the ratio of the first length D1 to the second length D2 is greater than or equal to 0.25 and less than or equal to 0.55. In this manner, in the first section 3312, the space in the first gripping portion 11 can be fully utilized, and thus the complete machine arrangement is more reasonable.

The ratio of the volume of the first section 3312 to the volume of the balance weight 331 is greater than or equal to 0.05 and less than or equal to 0.35. According to the mass calculation formula, in the case where the density is constant, the volume is proportional to the weight, that is, the greater the volume is, the greater the weight is, that is, the preceding ratio also reflects the ratio range of the weight of the first section 3312 to the overall weight of the balance weight 331. The ratio of the weight of the balance weight 331 extending in the first gripping portion 11 to the overall weight of the balance weight 331 is in a relatively reasonable range so that the space in the first gripping portion 11 is fully utilized, and thus the connection portion 13 has enough space in which the swing assembly 34 and other structures can be disposed. The first section 3312 is disposed in the connection portion 13. To ensure the balance of the reciprocating movement of the reciprocating rod 311, the dimension of the second section 3314 in the length direction inevitably increases so that the dimension of the complete machine in the length direction increases, and thus the reciprocating saw 100 is too long in the length direction, which is not conducive to the operation of the user. In the case where the ratio of the weight of the first section 3312 in the first gripping portion 11 to the overall weight of the balance weight 331 is too large, the volume of the first section 3312 in the first gripping portion 11 inevitably become larger so that the dimension of the first section 3312 in the up-and-down direction becomes larger, and thus the reciprocating saw 100 in the up-and-down direction is too long in dimension, which is conducive for the user to hold. Further, in the case where the ratio of the volume of the first section to the volume of the balance weight is greater than or equal to 0.1 and less than or equal to 0.3, the effect is better.

Referring to FIGS. 1 and 3 and FIGS. 13 to 16, the power assembly 20 further includes a barrel 25, a cooling fan 22, a cover 23, and a drainage component 24. The barrel 25 is sleeved in the circumferential direction of the motor 21, and the motor 21 is at least partially disposed in the barrel 25. The cooling fan 22 is configured to generate a cooling airflow, and the cooling fan 22 can be driven by the motor shaft 211 to rotate around the motor axis 101. The cover 23 is disposed between the cooling fan 22 and a stator 212 of the motor 21. The cover 23 includes a central hole 231 that allows the motor shaft 211 and the cooling airflow to pass through, a back side surface 233 adjacent to the stator 212, and a front side surface 232 farther from the stator 212 relative to the back side surface 233. The drainage component 24 is at least partially disposed on the outer circumference of the cover 23, and the drainage component 24 is configured to restrict the movement of the cooling airflow around the outer circumference of the cover 23, that is, the drainage component 24 and the cover 23 fit with each other and are configured to prevent the cooling airflow from swirling to the back side surface 233. Alternatively, the drainage component 24 and the cover 23 fit with each other and prevent the cooling airflow from being discharged from the outer circumference of the cover 23. Specifically, the cooling fan 22 is disposed in front of the stator 212, and the cooling fan 22 is installed on the motor shaft 211 and rotates synchronously with the motor shaft 211. The casing 10 is provided with an air outlet 110 from which the cooling airflow is discharged, and the air outlet 110 is disposed in the circumferential direction of the drainage component 24. An air inlet 120 in which the cooling airflow enters is formed behind the motor 21, specifically, on the casing 10 behind a printed circuit board (PCB) board. In the case where the user drives the motor 21 to rotate, a bevel gear fixedly connected or integrally formed on the motor shaft 211 meshes with the meshing surface 3212 of the first transmission member 321 so that the rotational movement of the motor 21 is transmitted to the first transmission member 321. In the case where the motor 21 rotates, the cooling fan 22 is driven to rotate; the cooling airflow enters from the air inlet 120, flows through the PCB board, enters the stator 212, and then passes through the central hole 231 of the cover 23; guided by the drainage component 24, part of the cooling airflow is discharged from the air outlet 110 on the casing 10 in the circumferential direction of the cooling fan 22; and part of the cooling airflow continues to flow forward to the gear box 14 to dissipate heat from the gear box 14 and finally flows out from a front opening of the casing 10. During the rotation of the cooling fan 22, a high-pressure region and a low-pressure region are formed in the regions corresponding to the front side surface 232 and the back side surface 233, that is, the cooling airflow is sucked from the low-pressure region and then enters the high-pressure region, and the drainage component 24 and the cover 23 fits with each other and prevent the cooling airflow from the low-pressure region corresponding to the back side surface 233 of the cooling fan 22 from flowing into the high-pressure region corresponding to the front side surface 232 of the cooling fan 22 so that the following problem can be avoided: part of the airflow is sucked into the low-pressure region corresponding to the back side surface 233 again to generate the swirling airflow. In addition, the following problem can also be avoided: the hot airflow in the high-pressure region enters the low-pressure region and affects heat dissipation. Through the preceding arrangement, the flow path of the cooling airflow can be better planned, and thus the cooling efficiency can be improved. In the present application, the cooling fan 22 is specifically a centrifugal fan.

The drainage component 24 is disposed in the casing 10, the drainage component 24 may rotate relative to the cover 23, and the drainage component 24 is provided with an opening through which the motor 21 passes. Specifically, the opening is substantially circular, and of course, the opening may have other shapes such as regular polygons; the shape of the opening is not limited herein. In the present application, preferably, the opening is circular, and the drainage component 24 is provided with an opening, which is conducive to installing the motor 21. The drainage component 24 is disposed around the cooling fan 22, that is, the dimension of the opening of the drainage component 24 is greater than the outer diameter of the motor 21.

As shown in FIGS. 13 to 20, the inner wall of the drainage component 24 has an inner diameter A1 along a direction perpendicular to the motor axis 101. The outer circumference of the cover 23 has an outer diameter B1 along the direction perpendicular to the motor axis 101. The ratio of the inner diameter A1 to the outer diameter B1 is greater than or equal to 0.8 and less than or equal to 1.2. In an example, the drainage component 24 is not in contact with the cover 23, and the projections of the drainage component 24 and the cover 23 on a plane perpendicular to the motor axis 101 partially overlap, that is, the drainage component 24 is disposed on the outside of the cover 23 and partially overlaps the radial part of the cover 23, that is, a labyrinth structure is formed between the cover 23 and the drainage component 24; or the ratio of the inner diameter A1 to the outer diameter B1 is greater than or equal to 0.8 and less than 1. Specifically, the drainage component 24 is connected to the barrel 25, the drainage component 24 is fixedly connected to or integrally formed with the barrel 25, or the drainage component 24 is fixedly connected to or integrally formed with the casing 10. The cover 23 is fixedly connected to the cooling fan 22, that is, the drainage component 24 and the cover 23 may rotate relative to each other. In this example, the cover 23 is fixedly connected to the cooling fan 22. Specifically, the cooling fan 22 is provided with a positioning post extending backward along the direction of the motor axis 101, and the cover 23 is formed with a limiting hole corresponding to the positioning post, that is, the limiting hole on the cover 23 is sleeved on the positioning post so that a synchronous rotation can be achieved. The cover 23 further includes an extension portion 234 extending backward along a linear direction, where the linear direction is parallel to or obliquely intersects the motor axis 101, which is not limited herein. In the present application, the case where the linear direction is parallel to the direction of the motor axis 101 is used as an example, and any limitation to the extension portion 234 below is also applicable to the case where the linear direction obliquely intersects the direction of the motor axis 101. The drainage component 24 is provided with a ring 241 inward in the radial direction.

Figure 19:
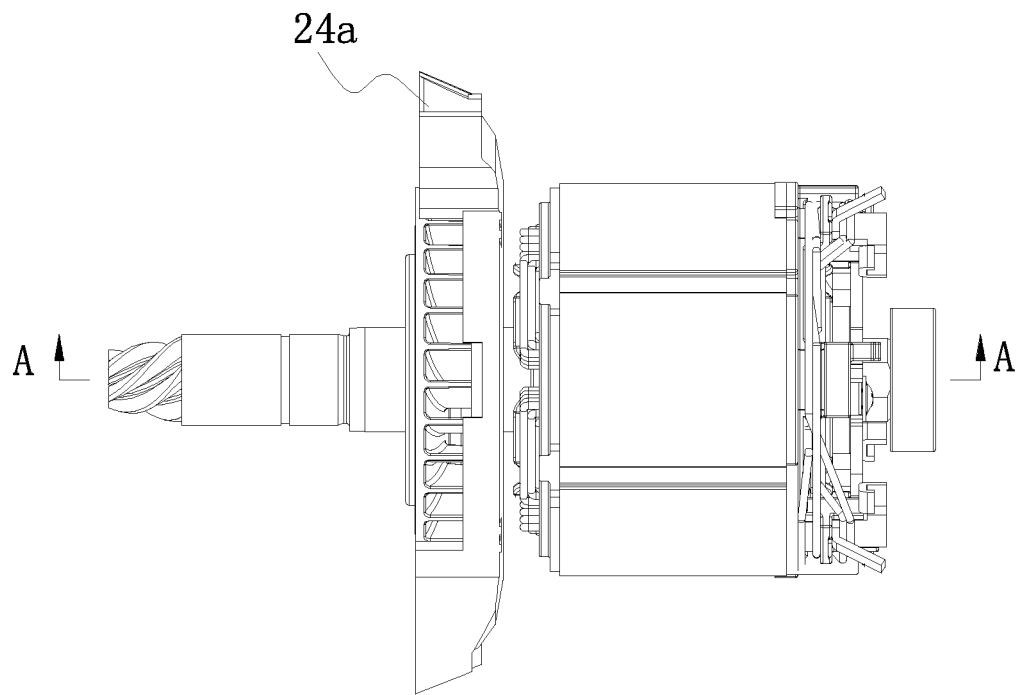
FIG. 19 is a plan view of a power assembly according to another example of the present disclosure.
Figure 20:
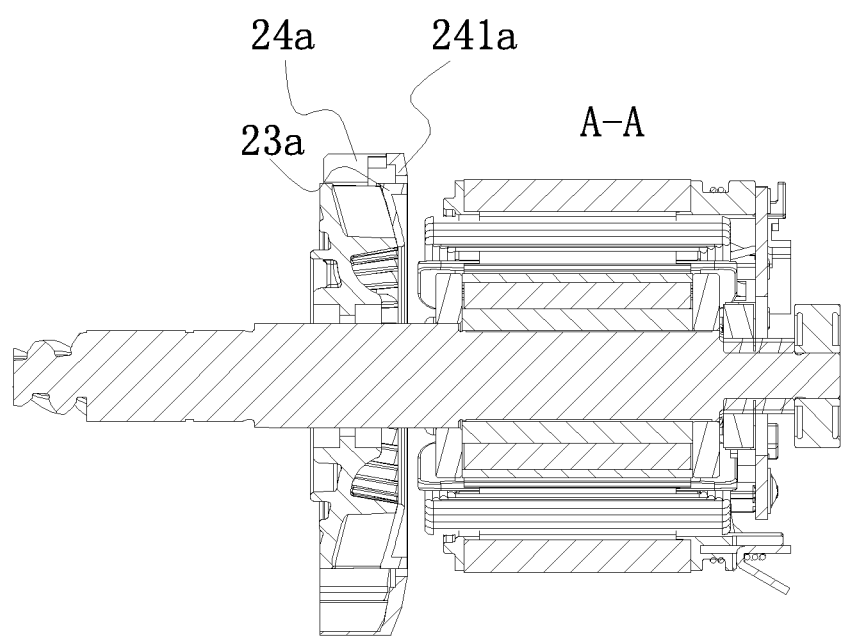
FIG. 20 is a sectional view of the structure in FIG. 19 taken along the A-A direction.

The ring 241 is provided with an opening through which the motor 21 passes. The inner wall of the ring 241 has an inner diameter A2 along the direction perpendicular to the motor axis 101, and the extension portion 234 has an outer diameter B2 along the direction perpendicular to the motor axis 101, where the ratio of A2 to B2 is greater than or equal to 1.02 and less than or equal to 1.2, that is, the ratio of the outer diameter of the extension portion 234 to the inner diameter of the ring 241 is greater than or equal to 1.02 and less than or equal to 1.2. In this manner, the cover 23 and the bracket of the drainage component 24 have enough space for the cover 23 to rotate relative to the drainage component 24; meanwhile, the cooling airflow cannot swirl to the low-pressure region so that airflow disturbance can be avoided. It is to be noted that the inner diameter A2 of the ring 241 in this example is also the inner diameter A1 of the drainage component 24. In the case where the ratio of the outer diameter of the extension portion 234 to the inner diameter of the ring 241 is greater than or equal to 1.07 and less than or equal to 1.15, the effect is better. Of course, in another feasible example, as shown in FIGS. 19 to 20, the drainage component 24a is not in contact with the cover 23a, the ring 241a of the drainage component 24a is disposed adjacent to the cover 23a, and the ring 241a at least partially overlaps the cover 23a in the axial direction; meanwhile, the ring 241a and the outer circumference of the cover 23a do not overlap in the radial direction. In this example, the ratio of the inner diameter of the ring 241a to the outer diameter of the cover 23a is greater than or equal to 1 and less than or equal to 1.2. In this manner, the effect in the preceding example can be substantially achieved, that is, the drainage component 24a is configured to fit with the cover 23a to stop 90% or more of the cooling airflow from entering from the first region to the second region. Of course, it is also feasible that the ring is not provided, the inner diameter of the drainage component is greater than the outer diameter of the cover, and the ratio of the inner diameter of the drainage component to the outer diameter of the cover is greater than or equal to 1 and less than or equal to 1.2.

The drainage component 24 is provided with several stoppers 242 in the circumferential direction, the stoppers 242 are fixedly connected to or integrally formed with the drainage component 24, the stopper 242 is provided with several stopping ribs 243 arranged at intervals, the stopping ribs 243 are arranged in the circumferential direction of the cooling fan 22, and the stopping ribs 243 and the blades of the cooling fan 22 at least partially overlap in the axial direction of the motor axis so that the flow direction of the cooling airflow can be well guided. The stoppers 242 are disposed at the air outlet 110. Specifically, a guide channel is formed between the stopping ribs 243, and guide channels substantially correspond to the blades of the cooling fan 22 and are configured to guide the cooling airflow output by the cooling fan 22. That is, through the preceding arrangement, the cooling airflow can be better discharged from the air outlet 110; meanwhile, the user can be prevented from being able to directly touch the cooling fan 22, thereby protecting the cooling fan 22 and ensuring the normal operation of the reciprocating saw 100. To better guide the cooling airflow, the edge surface of the stopping rib 243 is configured to be obliquely guided to the motor shaft 211. Through the preceding arrangement, the cooling airflow can be guided to flow out obliquely so that the cooling airflow can be prevented from blowing onto the user, especially from blowing into the eyes of the user, and thus a safety accident can be prevented. In the present application, the distance H between the edge surfaces of two adjacent stopping ribs 243 is less than or equal to 15 mm. The gap between the stopping ribs 243 is within the preceding range so that the finger of the user can be prevented from deeply touching the cooling fan 22, and thus the operation of the cooling fan 22 is not affected.

What is claimed is:

1. A reciprocating saw, comprising:
a casing;
a motor disposed in the casing;
a transmission assembly connected to the motor;
a reciprocating assembly, connected to the transmission assembly, comprising an output assembly on which a cutting accessory is installed;
a swing assembly disposed between the transmission assembly and the reciprocating assembly; and
a balance weight at least partially disposed between the transmission assembly and the reciprocating assembly configured to balance movement of the reciprocating assembly;
wherein the transmission assembly comprises a first transmission member that is capable of being driven by the motor to rotate around a first axis, the swing assembly comprises a floating support member configured to drive the reciprocating assembly to perform an orbital motion, the first transmission member is provided with a cam surface configured to be in contact with the floating support member to drive the floating support member to move in an up-and-down direction parallel to the first axis, the balance weight is provided with an escape opening, and the escape opening is disposed on a path on which the floating support member moves in the up-and-down direction.

2. The reciprocating saw of claim 1, wherein the motor comprises a motor shaft that is rotatable around a motor axis, the first transmission member further comprises a meshing surface that is disposed opposite to the cam surface, and the meshing surface meshes with an end of the motor shaft.

3. The reciprocating saw of claim 1, wherein the transmission assembly further comprises a rotation member and an eccentric member, the rotation member is configured to be connected to the first transmission member and rotate coaxially with the first transmission member, the eccentric member is configured to be connected to the rotation member and disposed eccentrically with respect to an axis of the rotation member, and the eccentric member is slidably connected to the reciprocating assembly.

4. The reciprocating saw of claim 1, wherein the transmission assembly further comprises a positioning bearing configured to position the first transmission member and the positioning bearing is disposed on a lower side of the first transmission member along a direction of the first axis.

5. The reciprocating saw of claim 4, wherein the casing comprises a first gripping portion and a second gripping portion disposed front and back, the first gripping portion is disposed closer to the cutting accessory, the second gripping portion is disposed on a back side of the casing, the reciprocating saw further comprises a support base component installed on the casing, the support base component comprises a support base, the support base is installed on the casing, at least one installation position on which the support base is installed exists on the casing, the casing at the at least one installation position has a first distance L1 along the direction of the first axis, the casing at an axis of the positioning bearing has a second distance L2 along the direction of the first axis, and a ratio of the first distance L1 to the second distance L2 is greater than or equal to 0.6 and less than or equal to 0.8.

6. The reciprocating saw of claim 1, wherein the escape opening has a width W1 in a left-and-right direction perpendicular to the up-and-down direction, the floating support member has a width W2 in the left-and-right direction perpendicular to the up-and-down direction, and W1 is greater than W2.

7. The reciprocating saw of claim 6, wherein a sliding groove is formed on the balance weight and is configured to guide movement of the balance weight and a sliding member that fits with the sliding groove is installed in the housing.

8. The reciprocating saw of claim 1, wherein the floating support member is at least partially disposed in the escape opening.

9. The reciprocating saw of claim 1, wherein the floating support member passes through the escape opening.

10. The reciprocating saw of claim 1, wherein the balance weight is recessed forward to form the escape opening.

11. The reciprocating saw of claim 1, wherein an overall dimension of the balance weight and the floating support member in a front-and-back direction is less than a sum of a dimension of the balance weight in the front-and-back direction and a dimension of the floating support member in the front-and-back direction.

12. A reciprocating saw, comprising:
a casing;
a reciprocating assembly comprising an output assembly on which a cutting accessory is installed;
a power assembly comprising a motor configured to drive the reciprocating assembly;
a transmission assembly configured to transmit power between the power assembly and the reciprocating assembly;
a swing assembly comprising a floating support member configured to drive the reciprocating assembly to perform an orbital motion; and
a balance weight at least partially disposed between the transmission assembly and the reciprocating assembly configured to balance movement of the reciprocating assembly;
wherein the transmission assembly comprises a first transmission member rotatable around a first axis, the first transmission member is provided with a cam surface configured to be in contact with the floating support member to drive the floating support member to move, the balance weight is provided with an escape opening, and the escape opening is disposed on a path on which the floating support member moves in an up-and-down direction.

13. The reciprocating saw of claim 12, wherein the motor comprises a motor shaft rotatable around a motor axis, the first transmission member further comprises a meshing surface that is disposed opposite to the cam surface, and the meshing surface meshes with an end of the motor shaft.

14. The reciprocating saw of claim 12, wherein the transmission assembly further comprises a rotation member configured to be connected to the first transmission member and rotate coaxially with the first transmission member and an eccentric member configured to be connected to the rotation member and disposed eccentrically with respect to an axis of the rotation member and the eccentric member is slidably connected to the reciprocating assembly.

15. The reciprocating saw of claim 12, wherein the transmission assembly further comprises a positioning bearing configured to position the first transmission member and the positioning bearing is disposed on a lower side of the first transmission member along a direction of the first axis.

16. The reciprocating saw of claim 12, wherein the floating support member is at least partially disposed in the escape opening.

17. The reciprocating saw of claim 12, wherein the floating support member passes through the escape opening.

18. The reciprocating saw of claim 12, wherein the balance weight is recessed forward to form the escape opening.

19. The reciprocating saw of claim 12, wherein an overall dimension of the balance weight and the floating support member in a front-and-back direction is less than a sum of a dimension of the balance weight in the front-and-back direction and a dimension of the floating support member in the front-and-back direction.

\* \* \* \* \*